US005762290A

United States Patent [19]
Dupont

[11] Patent Number: 5,762,290
[45] Date of Patent: Jun. 9, 1998

[54] SYSTEM FOR GUIDING A MISSILE IN ALIGNMENT ONTO A TARGET

[75] Inventor: Stéphane Dupont, Gif sur Yvette, France

[73] Assignee: Aerospatiale Societe Nationale Industrielle, Paris, France

[21] Appl. No.: 915,994

[22] Filed: Aug. 21, 1997

Related U.S. Application Data

[63] Continuation of Ser. No. 665,871, Jun. 19, 1996, abandoned.

[30] Foreign Application Priority Data

Jun. 28, 1995 [FR] France ..................... 95 07764

[51] Int. Cl.$^6$ ........................................ F41G 7/00
[52] U.S. Cl. ........................... 244/3.15; 244/3.19
[58] Field of Search ................... 244/3.11, 3.16, 244/3.19, 3.2

[56] References Cited

U.S. PATENT DOCUMENTS

| | | |
|---|---|---|
| 4,589,610 | 5/1986 | Schmidt . |
| 4,710,028 | 12/1987 | Grenier et al. .............. 356/375 |
| 5,001,647 | 3/1991 | Rapiejko et al. ............ 244/3.2 |
| 5,081,345 | 1/1992 | Grenier et al. .............. 356/141 |
| 5,208,757 | 5/1993 | Appriou et al. . |
| 5,253,823 | 10/1993 | Lawrence .................... 244/3.15 |

FOREIGN PATENT DOCUMENTS

| | | |
|---|---|---|
| 0206912A1 | 12/1986 | European Pat. Off. . |
| 0425355A1 | 5/1991 | European Pat. Off. . |
| 2261133 | 5/1993 | United Kingdom . |

OTHER PUBLICATIONS

Hepner et al, "Observability Analysis for Target Maneuver Estimation Via Bearing–Only and Bearing–Rate–Only Measurements", Journal of Guidance, Control and Dynamics, vol. 13, No. 6, 1 Nov. 1990, pp. 977–983, XP 000248896.
Patent Abstracts of Japan vol. 006, No. 156 (p.135), 17 Aug. 1982 & JP–A–57 073419 (Mitsubishi Electric Corp) 8 May 1982.
Patent Abstracts of Japan, vol. 012, No. 008 (P–654), 12 Jan. 1988 & JP–A–62 168206 (Mitsubishi Electric Corp) 24 Jul. 1987.

*Primary Examiner*—Charles T. Jordan
*Assistant Examiner*—Theresa M. Wesson
*Attorney, Agent, or Firm*—Watson Cole Stevens Davis, P.L.L.C.

[57] ABSTRACT

The present invention relates to a system for guiding a missile in alignment onto a moving target. In particular, the guidance computer of the system has a first unit for estimating the state of the missile and the movements of a target on the basis of the measurement of the position of the missile with respect to a datum axis, obtained by angular deviation measuring means, and by using a model of the dynamic behavior of the missile as well as kinematic model of the target. Additionally, the guidance computer has a second unit linked to the first unit for deriving tracking orders and datum values for slaving the missile, and a third unit linked to the first and second units for deriving the control order applied to the missile and the first unit.

4 Claims, 3 Drawing Sheets

SYSTEM FOR GUIDING A MISSILE IN ALIGNMENT ONTO A TARGET

This application is a continuation of application Ser. No. 08/665,871, filed Jun. 19, 1996 (abandoned).

The present invention relates to a system for guiding a missile in alignment onto a target, more particularly for an anti-tank missile.

Guidance in alignment consists in slaving the missile to a datum axis which links the firing post to the target. All existing systems include a means of measuring the position of the missile to be guided with respect to this datum axis, measurement means generally called: angular deviation measuring device. This measurement is used by a guidance computer which determines the control command to be applied to the missile in order to keep it on the datum axis. Moreover, in order to ensure the stability of the missile, all existing systems include a phase-advance corrector network. This slaving principle generally performs well against fixed targets, but, in principle, exhibits a systematic lag against moving targets. It is then possible to combine a phase delay (or integral network) or a pure integrator with the corrector network. The lag can thus be reduced, or even cancelled out, but with a response time which is much longer than the response time of the missile.

Another solution consists in measuring the angular speed of the datum axis and in deriving a tracking order proportional to this measurement. However, this requires investment in a sensor. Moreover, when the guidance computer is installed on board the missile, the measurement is not directly available and has to be transmitted by wire or electromagnetic wave, which represents an additional constraint.

The object of the present invention is to avoid these drawbacks. It relates to a system for guiding a missile in alignment ensuring, in principle, zero lag against a moving target, without additional manufacturing cost. The system of the invention should moreover make it possible to filter the measurement of the position of the missile with a phase shift Less than that of a phase-advance corrector network, and thus to enhance the stability of the missile.

To this end, the system for guiding a missile in alignment onto a moving target, of the type including angular deviation measuring means, for measuring the position of the missile with respect to a datum axis, and a guidance computer for supplying control orders to said missile as a function of said angular deviation measurements, is noteworthy, according to the invention, in that said guidance computer comprises:

first means for estimating the state of the missile and the movements of the target on the basis of the measurement of the position of the missile with respect to the datum axis, obtained by said angular deviation measuring means, by using a model of the dynamic behavior of the missile as well as a kinematic model of the target;

second means intended to derive tracking orders and datum values for slaving the missile, which are linked to said first means; and third means for deriving the control order applied to the missile, which are linked to said first and second means, so as, on the one hand, to supply said first means with said control order and, on the other hand, to receive the estimated state of the missile from said first means and the tracking orders and the slaving datum values from said second means.

The stability of the missile is thus enhanced, while, in principle, guaranteeing zero lag.

Advantageously, said first means for estimating the movements of the target consist of a Kalman filter.

According to another characteristic of the invention, the system comprises a fourth (optional) means for measuring parameters other than the position of the missile with respect to the datum axis, which are linked, on the one hand, to said missile and, on the other hand, to said first means.

Moreover, the system comprises fifth means intended to change the reference system for the position of the missile from a fixed reference system to a moving reference system, related to the target, which are linked to said angular deviation measuring means.

The figures of the attached drawing will give a good understanding of how the invention can be produced.

Figure 1:
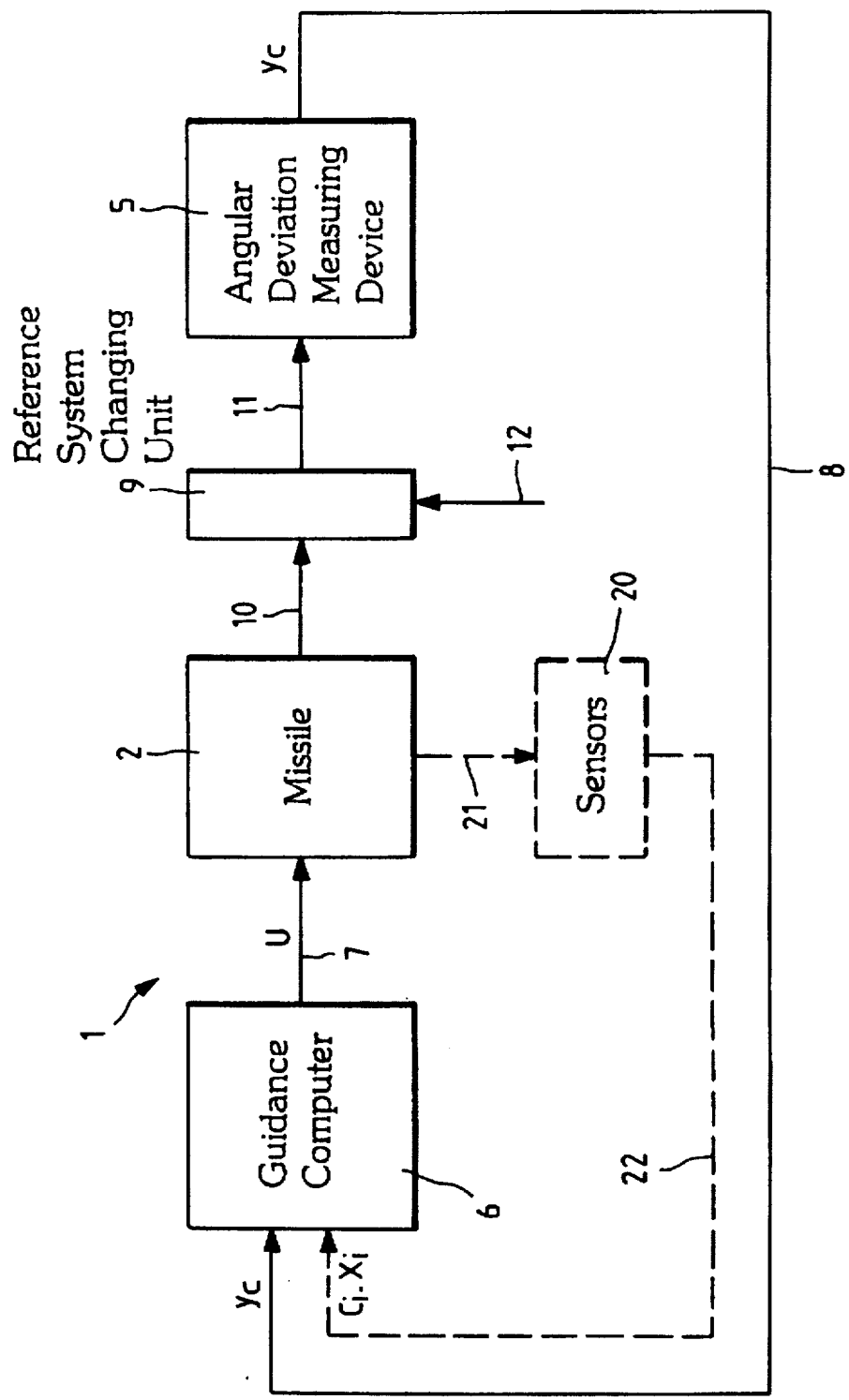
FIG. 1 is a block diagram of the guidance system according to the invention.

As can be seen in FIG. 1, the system 1 for guiding a missile 2, launched from a firing post 4 (FIG. 3), in alignment onto a moving target 3 (FIG. 3), comprises an angular deviation measuring device 5 for measuring the position of the missile ($Y_c$) with respect to a datum axis $\vec{x}_c$ (FIG. 3), and a guidance computer 6 for supplying control orders U to the missile 2 (link 7) as a function of said angular deviation measurements. To this end, the angular deviation measuring device 5 is linked to the guidance computer 6 by the link 8, as well as, obviously, the missile 2, via fifth means 9 which are intended to change the reference system for the position of the missile from a fixed reference system $R_f$, $\vec{x}_f$, $\vec{y}_f$, $\vec{z}_f$ in FIG. 3) (link 10 in FIG. 1) to a moving reference system, related to the target ($R_c$, $\vec{x}_c$, $\vec{y}_c$, $\vec{z}_c$ in FIG. 3) (link 11 in FIG. 1), taking the movements of the target into account (input 12 in FIG. 1).

Figure 2:
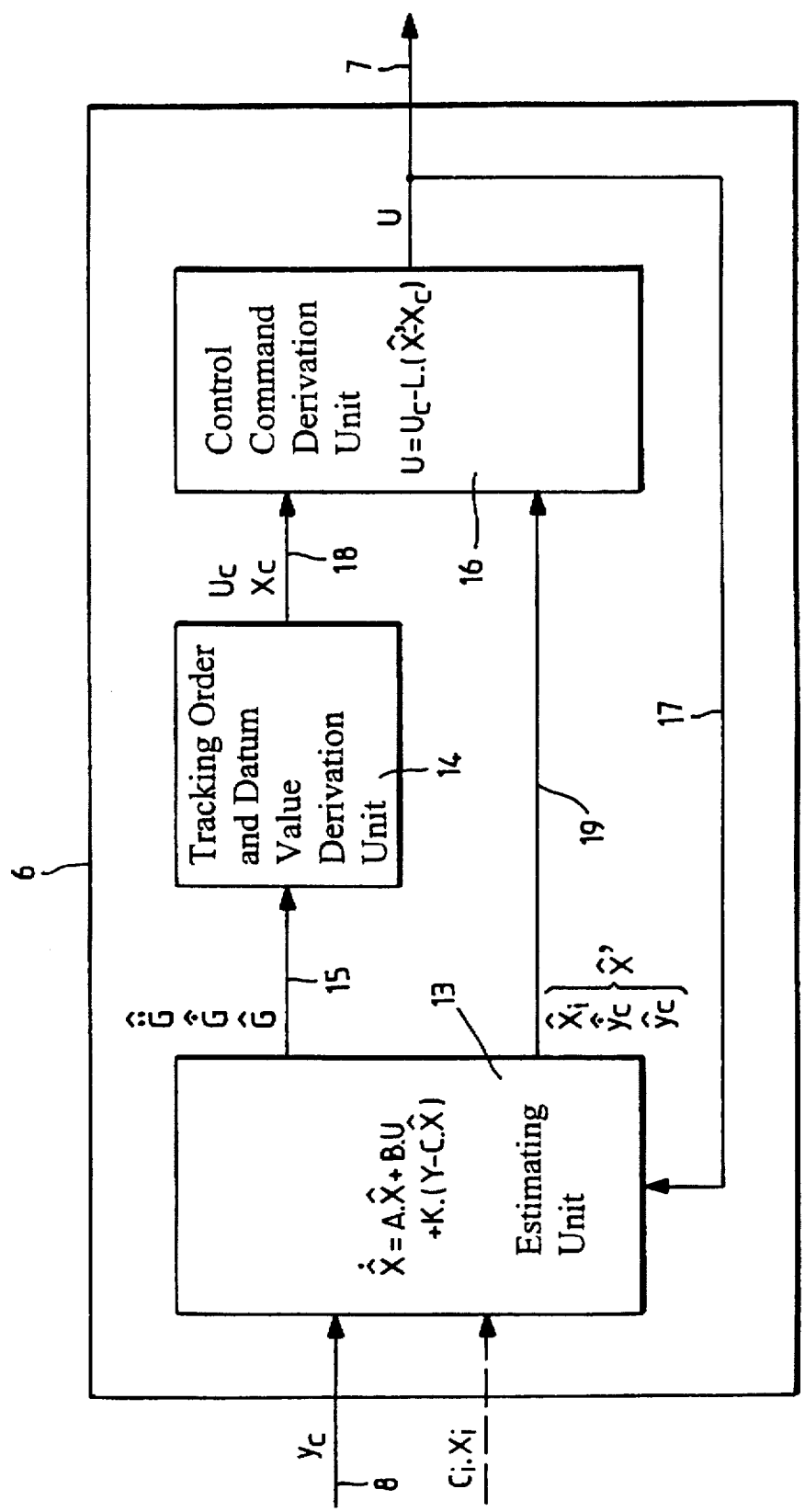
FIG. 2 is a block diagram of the guidance computer of the system of FIG. 1.

More particularly, according to the invention, the guidance computer 6 comprises (FIG. 2):

first means (13), particularly a Kalman filter, for estimating the state of the missile and the movements of the target 3 on the basis of the position of the missile 2 with respect to the datum axis $\vec{x}_c$, obtained from the angular deviation measurement device 5, by using a model of the dynamic behavior of the missile 2, as well as a kinematic model of the target 3;

second means 14, intended to derive tracking orders and datum values for slaving the missile 2, which are linked to the first means 13 by a link 15 supplying the estimated movements of the target; and third means 16 for deriving the control command U applied to the missile :2 (link 7, the output U of the third means 16 also being applied to one input of the first means 13 via a link 17), said third means 16 receiving, on the one hand, the tracking orders and the slaving datum values via the link 18 and, on the other hand, the estimated state of the missile 2 via the link 19.

Thus, the estimation of the movements of the target makes it possible to derive slaving datum values for the missile. To that end, with the guidance computer, in the course of the flight, deriving the control orders applied to the missile, these orders can then be applied to the model of the missile in order to predict the trajectory thereof in a fixed reference system. The discrepancy between this prediction and the measurement of the position of the missile (expressed in the reference system of the datum axis, or target-related reference system) makes it possible to estimate the movement of the datum axis (angular acceleration, speed and position).

The estimation of the movement of the target is not, however, immediate, and requires the choice of an appropriate technique, particularly Kalman filtering. It makes it possible to estimate the movements of the target, but also to filter them, as well as to filter the measurement of the position of the missile, as well as of any other measurements of the state of the missile (heading, acceleration particularly), doing so by sensors 20 linked, on the one hand, to the missile 2 by the link 21 and, on the other hand, to said first means 13 by the link 22.

It is then necessary to choose a model of the target. In order to keep the acceleration of the target in the estimated state, the "constant acceleration" model is the most general.

The estimation of the movement of the moving (target) reference system then makes it possible to derive a tracking order and datum values for slaving the missile, which cancels out the lag on the moving target (azimuth and/or elevation), with a short response time.

The estimate can be produced both in the horizontal plane (estimate of the azimuth of the target reference system) and in the vertical plane (estimate of the elevation of the target reference system). As the structure and the principle are the same in the two planes, only the case of the horizontal plane will be explained.

Figure 3:
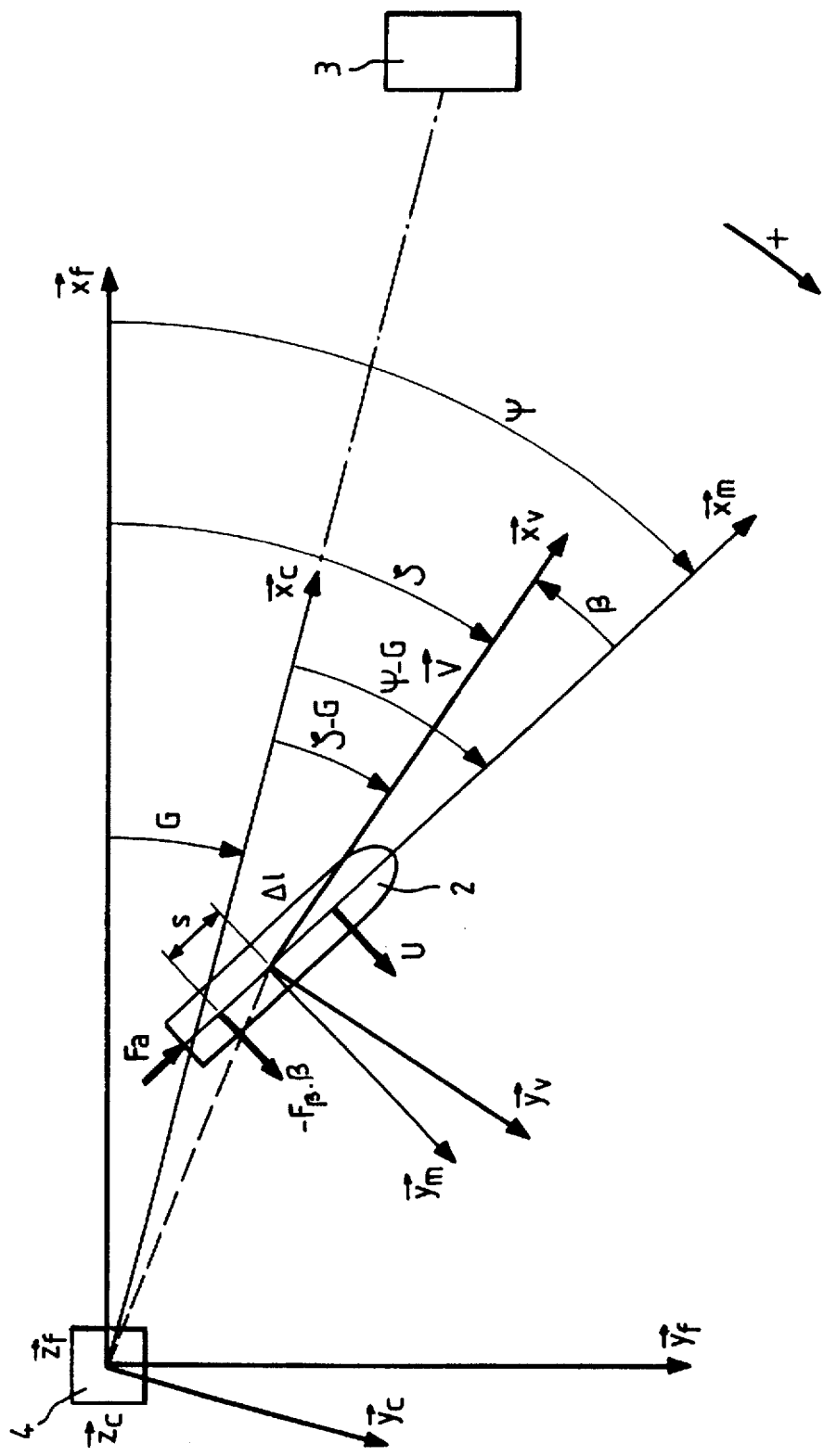
FIG. 3 is a diagram illustrating the implementation of the guidance system according to the invention.

The "fixed" ($R_f$) and "target" ($R_c$) reference systems are represented in FIG. 3 (azimuth, maneuvering to the right).

The following notation is used below:

$\beta$: missile sideslip $\psi$: missile heading y: position of the missile along $y_c$ (measurement of angular deviation of the missile)

$\vec{V}$: missile speed m: missile mass

I: transverse inertia of the missile

M$\alpha$: gradient of aerodynamic restoring moment

F$\beta$: aerodynamic lift gradient

Mr: aerodynamic damping in terms of moment

G: azimuth of the target reference system $\vec{F}a$: resultant of the "axial" forces applied to the missile (along its longitudinal axis)

$\vec{F}l$: resultant of the "lateral" forces applied to the missile

U: control command applied to the missile.

The fundamental equation of the dynamics is expressed, along $y_c$:

$$Fa.\sin(\psi-G)+Fl\cos(\psi-G)=m(\ddot{y}_c+2V\dot{G}+x\ddot{G}-y_c\dot{G}^2)$$

that is to say, after linearization around 0 for $\psi$, G, $y_c$:

$$\ddot{y}_c = \frac{1}{m}\delta F_l + \frac{Fa}{m}\psi - x\ddot{G} - 2V\dot{G} - \frac{Fa}{m}G$$

In order to express a linear model of the assembly (missile-target reference system), it is necessary to choose a model of the target reference system.

In order to keep all the terms in G (G, $\dot{G}$ and $\ddot{G}$), it is necessary to make an assumption about $\dddot{G}$. The most general is:

$$\dddot{G}=\phi$$

Hence the following model was obtained:

$$\begin{bmatrix} \dot{X}_i \\ \dot{y}_c \\ \ddot{y}_c \\ \dot{G} \\ \ddot{G} \\ \dddot{G} \end{bmatrix} = \begin{bmatrix} A_i & & & \mathbf{O} & & \\ \hline & 0 & 0 & -x & -2V & -(Fa)/m \\ & 1 & 0 & 0 & 0 & 0 \\ \mathbf{O} & 0 & 0 & 0 & 0 & 0 \\ & 0 & 0 & 1 & 0 & 0 \\ & 0 & 0 & 0 & 1 & 0 \end{bmatrix} \begin{bmatrix} X_i \\ y_c \\ \dot{y}_c \\ G \\ \dot{G} \\ \ddot{G} \end{bmatrix} + \begin{bmatrix} B_i \\ \hline \\ \mathbf{O} \\ \\ \end{bmatrix} U$$

$$\underbrace{\phantom{XXX}}_{\dot{X}} \quad \underbrace{\phantom{XXXXXXXXXXXXXXXXXX}}_{A} \quad \underbrace{\phantom{XXX}}_{X} \quad \underbrace{\phantom{XX}}_{B} \; \underbrace{\phantom{X}}_{U}$$

$A_i$, $B_i$, $X_i$ describe the "internal" model of the missile.

The minimum measurement for observability of G, $\dot{G}$, $\dddot{G}$ is $y_c$.

The angle of deviation measurement matrix is of the form:

$$Y = \begin{bmatrix} C_i & & \mathbf{O} & & \\ \hline \mathbf{O} & 0 & 1 & 0 & 0 & 0 \end{bmatrix} X$$

$\underbrace{\phantom{XXXXXXXXXXXXX}}_{C}$ $c_i$ corresponding to any supplementary measurements.

The equation for the complete filter is then:

$$\dot{\hat{X}} = A\hat{X} + BU + K(Y - C\hat{X})$$

The Kalman gains K are calculated conventionally by solving the Ricatti equation.

A model of a specific anti-tank missile is given below.

For the "internal" model of the missile, we have adopted the state variables: $-\beta$, $\psi$ and $\dot{\psi}$.

The "target reference" model has been simplified: $\dddot{G}=0$.

A supplementary measurement has been used: $\psi$

The complete model is then as follows:

$$\begin{bmatrix} -\dot{\beta} \\ \dot{\psi} \\ \ddot{\psi} \\ \dot{y}_c \\ \ddot{y}_c \\ \dot{G} \\ \ddot{G} \end{bmatrix} = \begin{bmatrix} \frac{-(Fa+F\beta)}{mV} & 1 & 0 & 0 & 0 & 0 & 0 \\ \frac{M\alpha}{I} & \frac{Mr}{I} & 0 & 0 & 0 & 0 & 0 \\ 0 & 1 & 0 & 0 & 0 & 0 & 0 \\ \hline -\frac{F\beta}{m} & 0 & \frac{Fa}{m} & 0 & 0 & -2V & \frac{Fa}{m} \\ 0 & 0 & 0 & 1 & 0 & 0 & 0 \\ 0 & 0 & 0 & 0 & 0 & 0 & 0 \\ 0 & 0 & 0 & 0 & 0 & 1 & 0 \end{bmatrix} \begin{bmatrix} -\beta \\ \psi \\ \dot{\psi} \\ y_c \\ \dot{y}_c \\ G \\ \dot{G} \end{bmatrix} + \begin{bmatrix} \frac{1}{mV} \\ \frac{\Delta l}{I} \\ 0 \\ \frac{1}{m} \\ 0 \\ 0 \\ 0 \end{bmatrix} U$$

$$\underbrace{\phantom{X}}_{\dot{X}} \quad \underbrace{\phantom{XXXXXXXXXXXXXXXXXXXXXXX}}_{A} \quad \underbrace{\phantom{X}}_{X} \quad \underbrace{\phantom{XX}}_{B} \; \underbrace{\phantom{X}}_{U}$$

with, as measurement matrix:

$$C = \begin{bmatrix} 0 & 0 & 1 & 0 & 0 & 0 & 0 \\ 0 & 0 & 0 & 0 & 1 & 0 & 0 \end{bmatrix}$$

In order to use the estimate of the movements of the target to derive slaving datum values, the following principle is used.

The principle is to determine a "nominal" "perfect" trajectory against a moving target, by resolving the equations For the flight mechanics with the "equilibrium" conditions.

$y_c = 0$ $\dot{y}_c = 0$ $\ddot{y}_c = 0$ $x_j = 0$

Thus a state $X_c$ is obtained as a function of $(\hat{G}, \hat{\dot{G}}, \hat{\ddot{G}})$ which will serve as a datum value for deriving the control command.

The control command $U_c$ associated with state $X_c$ will then be applied systematically to the missile.

In the case of the anti-tank missile (specific anti-tank missile model and simplified target reference system model), $\hat{G}$ is used to derive a tracking control command:

$$U_c = K_2 \frac{mV}{GAIN} \hat{G}$$

GAIN being the static gain of the missile and $K_2$ being a function of the kinematic and dynamic characteristics of the missile:

$$K_2 = 2 - \frac{XFa}{mV^2}$$

(X: down-range distance of the missile)

In the case of a guided missile, $\hat{G}$ and $\hat{\dot{G}}$ are used to derive datum values on the returns in heading ($\psi$) and in heading speed ($\dot{\psi}$):

$\psi_c = \hat{G} + K_4 \hat{\dot{G}}$ $\dot{\psi}_c = K_5 \hat{\dot{G}}$ with:

$K_4 = K_1 + K_3$ $K_1 = X/V$ $K_3 = cK_2$ $$c = \frac{mV\Delta 1 + Mr}{\Delta 1 (Fa + F\beta) - M\alpha}$$

$K_5 = K_2 + K_3$.

It will be shown below how it is possible to establish a missile model, from an example of a missile with canard empennage, that is to say in the case where the control surface is in front of the center of gravity.

This model makes it possible to predict the trajectory of the missile in a fixed reference system. The fundamental relationship of the dynamics, applied overall to the missile, makes it possible to express the (absolute) acceleration of the missile as a function of the forces which are applied to it:

U: control force

Fa: axial thrust (less the drag)

$F_\beta.\beta$: lift force.

However, this relationship does not suffice to determine the acceleration of the missile, since one of the forces is a function of the sideslip of the missile $\beta$: this is the lift force $F_\beta.\beta$. A single relationship is then available for two unknowns ($\Gamma$, the acceleration and $\beta$, the sideslip). Hence the theorum of kinetic moment is used (originating from the fundamental relationship of the dynamics, taking account of the points of application of the forces). Thus a relationship is obtained between the heading $\psi$ of the missile and its side slip $\beta$.

$\Gamma$, $\psi$ and $\beta$ being related by a kinematic relationship ($\Gamma = V(\dot{\psi}+\dot{\beta})$), the two equations in $\psi$ and $\beta$ (or $\Gamma$ and $\psi$) can be solved.

The detail of the calculations set out above will be given below:

a) fundamental relationship of dynamics $$m\vec{\Gamma} = \Sigma \vec{F} \, (dm/dt \text{ neglected})$$

These vectors will be projected into the speed reference system (this is the most convenient one for obtaining at least substantially linear relationships).

Balance of forces in the speed reference system (along $\vec{y}_v$):

$U \rightarrow U \cos\beta \simeq U$ $Fa \rightarrow -Fa \sin\beta \simeq -Fa\beta$ $F_\beta.\beta \rightarrow -F_\beta.\beta.\cos\beta \simeq -F_\beta.\beta$ Acceleration (absolute) expressed in the speed reference system (along $\vec{y}_v$):

$$\vec{\Gamma} = \frac{d\vec{V}}{dt} = \frac{d}{dt}(V\vec{x}_v) = \dot{V}\vec{x}_v + V\dot{\zeta}\vec{y}_v$$

Thus the following equation is obtained:

$mV\dot{\zeta} = U - Fa.\beta - F_\beta.\beta$ $mV(\dot{\psi}+\dot{\beta}) = U - (Fa+F_\beta)\beta \; \zeta = \psi+\beta$ $$\dot{\beta} = -\frac{Fa+F_\beta}{mV} \beta - \dot{\psi} + \frac{1}{mV} U$$

b) theorem of kinetic moment $$I \frac{d\vec{\Omega}}{dt} = \Sigma \vec{M} \quad \left( \frac{dI}{dt} \text{ neglected} \right)$$

$I\ddot{\psi} = -F_\beta \cdot \beta \cdot s + M_r\dot{\psi} + \Delta 1 \, U$ $$\ddot{\psi} = -\frac{F_\beta \cdot s}{I} \beta + \frac{M_r}{I} \dot{\psi} + \frac{\Delta 1}{I} U$$

It will be noted that a third equation:

$$\ddot{y}_c = -\frac{F_\beta}{m} \beta + \frac{Fa}{m} \psi - 2v\dot{G} + \frac{Fa}{m} G$$

makes it possible (after integration) to predict the position of the missile in the target reference system.

If there is a discrepancy with the measurement, it is because the estimated azimuth G and the estimated speed of the azimuth Ġ are inaccurate. They are then automatically corrected by the Kalman filter.

I claim:

1. A system for guiding a missile in alignment onto a moving target, said system comprising an angular deviation measuring means for measuring a position of the missile with respect to a datum axis, and a guidance computer for supplying control orders to said missile as a function of said angular deviation measurements, wherein said guidance computer comprises:

first means for estimating a state of the missile and movements of the target according to a measured position of the missile with respect to the datum axis, obtained by said angular deviation measuring means, and by using a model of dynamic behavior of the missile and a kinematic model of the target;

second means for deriving tracking orders and datum values for slaving the missile to cancel out a lag in the tracking orders and the datum values with respect to the moving target, the tracking orders and datum values determining a nominal perfect trajectory of the missile with respect to the moving target by resolving equations for flight mechanics of the missile with equilibrium conditions of the missile, the second means being linked to said first means; and third means for deriving a control order applied to the missile, which are linked to said first and second means for supplying said first means with said control order and for receiving the estimated state of the missile from said first means and the tracking orders and the slaving datum values from said second means.

2. The system as claimed in claim 1, wherein said first means for estimating the movements of the target consist of a Kalman filter.

3. The system as claimed in claim 1, further comprising fourth means for measuring parameters other than the position of the missile with respect to the datum axis, which are linked to said missile and to said first means.

4. The system as claimed in claim 1, further comprising fifth means for changing a reference system for the position of the missile from a fixed reference system to a moving reference system, tied to the target, which are linked to said angular deviation measuring means.

* * * * *